United States Patent [19]
Oguri et al.

[11] 3,889,388
[45] June 17, 1975

[54] METHOD OF AND DEVICE FOR DRYING SMALL SOLIDS

[75] Inventors: Eizo Oguri, Kobe; Hiroshi Ogawa, Hyogo; Koki Date, Hyogo; Kanji Takeba, Hyogo, all of Japan

[73] Assignee: Takeda Chemical Industries, Ltd., Osaka, Japan

[22] Filed: Jan. 4, 1974

[21] Appl. No.: 430,928

Related U.S. Application Data
[63] Continuation-in-part of Ser. No. 162,457, July 14, 1971, abandoned.

[30] Foreign Application Priority Data
July 17, 1970  Japan.............................. 45-62965

[52] U.S. Cl.................................. 34/10; 34/57 D
[51] Int. Cl............................................ F26b 3/08
[58] Field of Search ............ 23/288 S; 34/10, 57 D, 34/57 R, 57

[56] References Cited
UNITED STATES PATENTS

| | | | |
|---|---|---|---|
| 2,856,273 | 10/1958 | Beber et al. | 23/288 S |
| 3,711,962 | 1/1973 | Fukuyo | 34/57 D |

*Primary Examiner*—William E. Wayner
*Attorney, Agent, or Firm*—Wenderoth, Lind & Ponack

[57] ABSTRACT

A method of and device for drying small-sized solids such as granular or crystalline particles in which drying is effected by the application of a drying medium to a bed of the granular or crystalline particles contained in a shell of a drier. During the drying operation, the bed of the particles in the shell is given a gentle motion caused by a stirrer while receiving the drying medium passing through the interstices among the particles at a speed lower than the minimum fluidizing velocity, the stirrer being operated at a comparatively lower rate so that the particles are not further pulverized or damaged.

5 Claims, 8 Drawing Figures

METHOD OF AND DEVICE FOR DRYING SMALL SOLIDS

This application is a continuation-in-part of application Ser. No. 162,457 filed July 14, 1971, now abandoned.

The present invention relates to the art of drying granular or crystalline solids by applying a drying medium thereto so as to flow upwardly through a stirred bed of the solids at a speed not more than the minimum fluidizing velocity.

From the practical viewpoint of commercial value, granular or crystalline material such as food additives including salt, sugar, mono-sodium L-glutamate, citric acid, 5'-ribonucleotides (e.g. disodium 5'-inosimate, disodium 5'-guanylate or mixtures thereof), etc. and pharmaceutical products including vitamin C, etc. must be, before they are placed on the market, dried to a considerably lower moisture content then they have at the end of the manufacturing process without the formation of lumps in the mass of the dried material and the destruction of the particle structure thereof, some of them requiring the surface of each solid to be polished during the drying process.

It has been well recognized by those skilled in the art that the present day technological level is not developed yet to such an extent as to provide a versatile drying method or apparatus adaptable for drying such granular or crystalline solids of any particle size that advantageously satisfies the above-mentioned requirements in addition to that heretofore normally required in the conventional drying process. Accordingly, for drying the granular or crystalline solids, either a rotary drier of the moving-bed type, such as a rotary kiln, or a reaction drier of the fluidized-bed type has been largely employed.

However, the rotary drier of the type above referred to has a drawback that the particle structure of the solids to be dried can be easily damaged when it strikes the inner surface of the rotating kiln or cylinder. On the other hand, the reaction drier of the type above referred to has a drawback that the solids to be dried have a tendency to bind to each other during the drying process, thereby to form lumps in the mass of the dried solids. Accordingly, in either case, rather than the abovementioned requirements being satisfied, degradation often appears in the quality of the dried solids with respect to the commercial value.

The present invention has been made in order to eliminate the degradation in the quality of the dried solids which may result from the disadvantages inherent in either of the conventional drying devices or methods. To this end, a considerable amount of time has been invested in the course of research and experiments in which L-glutamate was employed as the subject of the experiments since the commercial value thereof is believed to be more or less mainly affected by the abovementioned commercial requirements that it must satisfy upon completion of the drying operation.

The finding of the research and experiments on which the concept of the present invention is based was that, if a proper amount of the subject material having a relatively high moisture content was slowly dried at a temperature substantially equal to the body temperature of an experimenter while being placed on the palm of one hand and lightly rubbed by the palm of the other hand so as to impart motion thereto, a material satisfying the commercial requirements in every respect could be obtained. On the other hand, it was also found that, if the same subject material was dried to an appreciable extent approximately in the static condition, crystalline particles of the subject had a tendency to stick to each other so rigidly that the particle structure thereof was often damaged when an attempt was made to separate each lump thereof.

From the above findings, it can be taken for granted that the sticking phenomenon of the crystalline particles of the subject material will increase in proportion to the increase of the concentration of liquid present on the surface of each particle appearing during the progress of a drying operation. This liquid is normally composed of water and melted compounds constituting the subject material. If the moisture content of each particle attains a certain value at which the sticking phenomenon occurs (this value hereinafter referred to as the critica value or critical moisture content), the liquid present on the surface of each particle begins to re-crystallize and, in the course of such re-crystallization, the liquid on the surface of the crystalline particles acts as a binder. It can be also taken for granted that, in view of the fact that the critical moisture content is smaller than the initial moisture content which has been attained prior to the drying operation and is normally higher than the maximum or desired moisture content permissible in the subject mateial upon completion of the drying operation, a conventional drying system does not satisfactorily impart a motion or abrasion to a body of crystalline particles particularly during a period in which the condition of critical moisture content is instantaneously passed over and, therefore, no crystalline particles satisfying the commercial requirements can be obtained.

Hence, it has been concluded that, in order to obtain crystalline particles of L-glutamate of appreciably higher quality with respect to the commercial value, drying must be gently effected while a relative motion or abrasion is uniformly given to the crystalline particles, beginning from the state at which the moisture content is still higher than the critical value. The gentle drying hereinbefore referred to is a drying speed so low that, during the reduction of the moisture content from the initial value to the maximum or desired value as hereinbefore mentioned, a relative motion or abrasion can be satisfactorily produced among solid particles from sticking to each other during a period in which the critical moisture content is attained.

Accordingly, the present invention has for its essential object to provide a method of drying granular or crystalline solids, the principle of which has been obtained from the research and experiments conducted in an attempt to eliminate the disadvantages inherent in the conventional drying devices or methods.

Another object of the present invention is to provide a method of drying granular or crystalline solids, wherein drying is effected by applying a drying medium so that it flows upwardly through a gently stirred bed of the solids at a speed not more than the minimum fluidizing velocity at which the bed becomes fluidized, i.e. solids commence to be substantially fully supported by drag forces caused by the drying medium applied.

A further object of the present invention is to provide a device for drying granular or crystalline solids capable of performing the drying method based on the principle that has been obtained from the research and experiments conducted in an attempt to eliminate the disadvantages inherent in the conventional drying devices or methods.

A still further object of the present invention is to provide a device for drying granular or crystalline solids capable of performing the drying method as described in the second object of the present invention.

It is another related object of the present invention to provide a drying method of the type above referred to which can be easily performed by a conventional drier of a similar construction to that employed in the present invention.

In a batch operation using the method of the present invention, it is to be noted that, even though the initial moisture content as defined by the amount of moisture present in each particle of granular or crystalline solids prior to the drying operation is naturally higher than the critical moisture content as defined by the amount of moisture present in each particle of granular or crystalline solids prior to the drying operation is naturally higher than the critical moisture content as hereinbefore defined, the difference between the initial moisture content and the critical moisture content must preferably be small for good drying efficiency, unless the solids are predried or preliminarily dried to such an extent as to make the initial moisture content thereof only slightly higher than the critical moisture content prior to the actual drying operation in which the principle of the present invention is embodied. Of course, this pre-drying operation may be omitted if the initial moisture content is slightly higher than the critical moisture content from the beginning. In any event, the value of either or both of the initial and critical moisture contents varies, depending upon the kind of granular or crystalline solids to be dried. For example, L-glutamate having a 0.3 to 1 mm. particle size has an initial moisture content of about 2.50 percent and a critical moisture content of 0.5 to 1 percent, granular sugar having particles of 0.3 to 1 mm. has an initial moisture content of about 2.8 percent and a critical moisture content of 2 to 2.5 percent, and citric acid has an initial moisture content of about 3.0 percent and a critical moisture content of 0.7 to 1.4 percent.

For continuous operation, there may be utilized at least three parts of the device, the first of which may be utilized for pre-heating, the second for actual drying based on the principle of the present invention, and the third for final drying which may be replaced by a conventional drier, for example, a fluidized-bed system. Alternatively, instead of the employment of three parts of the device, a single assembly capable of performing the above-mentioned three steps of operation in different units may be utilized.

In either case, the pneumatic speed of drying medium employed in actual drying should preferably, but not exclusively, be within the range of a value substantially equal to the minimum fluidizing velocity to a value of one half of said minimum fluidizing velocity. This minimum fluidizing velocity as hereinbefore and hereinafter recited in the description of the present invention means the pneumatic speed of drying medium passing through the interstices among the solids particles to be dried, the value of said speed being sufficient to cause the solids particles to the initially supported by drag forces produced by the drying medium. The value of said minimum fulidizing velocity varies, depending upon such factors as the particle size, the initial moisture content, the particle weight, the degree of motion given to the particles, and so on. In any event, the pneumatic speed of the drying medium must be not more than the minimum fluidizing velocity to achieve the optimum result.

This will be evidenced by a series of experiments conducted in connection with the present invention, the results of which are illustrated in the Examples I-III.

On the contrary, if the pneumatic speed is excessively higher than or is a multiple of the minimum fluidizing velocity, fluidization of bed of solids particles will occur so unfavorably that equilibrium between the optimum drying speed and the effect of the optimum fluidization which is caused exclusively by the stirrer may be destroyed. If the pneumatic speed is even slightly lower than the lower limit, the fluid shearing force exerted by the stirrer blades will be considerably reduced so that the expected optimum result cannot be ensured.

Furthermore, to achieve the optimum drying condition, stirring of a bed of the solids particles accommodated in a shell of the drier is carried out. In this case, although the stirring condition varies depending upon the particle size, the amount of charge, the size of each blade, and so on, the stirrer shaft is adapted to be driven by a motor at a low rate, preferably, so as to represent a Froude number within the range of $0.8 \times 10^{-3}$ to $13.0 \times 10^{-3}$ in consideration.

As hereinbefore stated, the drying system of the present invention is such that the solid particles to be dried are subjected to the flow of drying medium effected at a rate lower than the minimum fluidizing velocity and concurrently to the fluid shearing force properly exerted by the stirrer blades rotated at a comparatively low rate, which is contrary to the existing knowledge of the art in which it is believed a combination of such lower pneumatic speed with such lower rate of rotation of stirrer blades does not afford such advantageous results which have been found to be obtainable by the system of the present invention.

According to the present invention, it is to be noted that the drying medium as hereinbefore and hereinafter recited includes air or any other gases. In the case where the subject to be dried is susceptible to oxidation, the employment of inert gas is recommended. In addition, the drying medium is preferably heated. However, the temperature of the heated drying medium must be such that the chemical properties of the solid particles to be dried will not be damaged or spoiled by the elevated heat, the value of which varies depending upon the kind of the solid particles to be dried.

Furthermore, the system of the present invention is advantageously employed for drying small solids having a paraticle size within the range of from 1/20 to 10 mm.

Other objects and features of the present invention will become apparent to those skilled in the art from the following description taken in conjunction with preferred embodiments of the inventive drier shown in the accompanying drawings, in which.

Figure 1:
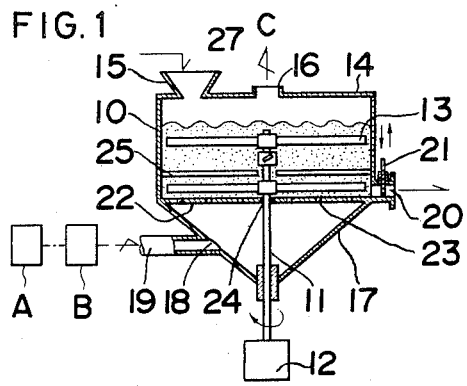
FIG. 1 is a longitudinal sectional view of a drier for batch operation which is capable of performing the method of drying concurrently provided by the present invention.

Referring first to FIG. 1, a drier capable of performing the method of the present invention, but not exclusive thereto, generally comprises a vertically upstanding shell 10 of substantially cylindrical shape, a stirrer including a stirrer shaft 11 adapted to be driven by a motor 12 at a selected rate of from 8 to 40 rpm and a plurality of stirrer blades 13 transversely extending from said shaft 11, a pneumatic source A adapted to feed fresh air to the interior of the shell 10, and a heater B disposed between the shell 10 and the pneumatic source A for heating the fresh air passing therethrough.

The cylindrical shell 10 has its upper end closed by a cover plate 14 having a hopper 15 thereon, through which a lot of solid particles to be dried can be fed into the interior of the shell 10, and a dust exit 16 which may be omitted so long as the solid particles do not produce dust, even when gently stirred. This shell 10 is from its intermediate portion thereof downwardly tapered to provide a tapered end portion 17 provided with an inlet port 18 connected with the pneumatic source A through the heater B by means of a conduit 19. The shell also has about its intermediate portion an outflow port 20 from which the dried particles can be recovered. The outflow port 20 is, in the instance as shown, provided with a shutter 21 which may be manually or automatically operated so as to open and close the outflow port 20.

Figure 2:
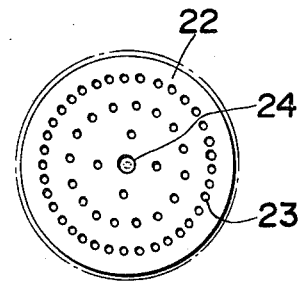
FIG. 2 is a top plan view of a drying medium distributor employed in the device of FIG. 1.

Accommodated within the shell 10 and horizontally lying about the intermediate portion of said shell 10 is a distributor 22 comprised, for example, of a disc plate having a plurality of small holes 23 and a large hole 24 through which the stirrer shaft 11 extends. Particularly as shown in FIG. 2, the disc plate 22 is preferably designed such that the number of small holes 23 occupying the surface thereof per unit area is gradually reduced from a portion adjacent to the periphery to a portion adjacent to the large hole 24.

Figure 3:
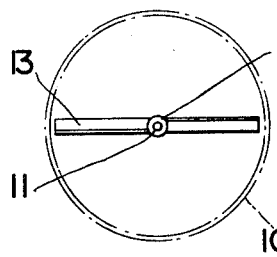
FIG. 3 is a top plan view of one pair of stirrer blades employed in the device of FIG. 1.
Figure 5:
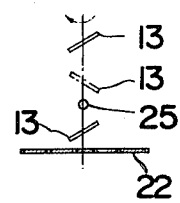
FIG. 5 is a lateral side view of the stirrer blades employed in the device of FIG. 1, showing an arrangement in which the blades are tilted.

The stirrer shaft 11 has one end connected with the motor 12 positioned outside the shell 10 and the other end extending through a bearing secured to the tapered extremity of the tapered end portion 17 into the interior of the shell 10. The end portion of the shaft 11 situated within the shell 10 above the distributor plate 22 is provided with three pairs of stirrer blades 13, each connected thereto by means of a mounting member 27. The blades 13 of each pair extend in opposite directions at right angles to the shaft 11 as shown in FIG. 3, and the pairs of blades 13 are alternately spaced 90° with respect to each other. The surface of each blade 13 which can have a section which is triangular, rectangular, foil-shaped, or the like, is tilted within a range of from 20° to 45°, preferably 30°, with respect to the horizontal plane, the upper and lower pairs of blades being downwardly oriented in the direction of rotation thereof while the intermediate pair thereof is upwardly oriented in the same direction, particularly as shown in FIG. 5. This arrangement is effective to ensure that when the stirrer shaft 11 is rotated so as to move the stirrer blades 13 through the bed horizontally, a horizontal fluidized bed shearing force is applied so that the fluidized bed of the solids particles will be properly sheared, even at a low rate of rotation of the stirrer blades 13 so that the particle structure will not be damaged. Of course, the shearing effect given by the above arrangement of the blades 13 is affected by the drag forces caused by the hot air passing through the interstices among the soilds particles to be dried. However, in the present invention, the drag forces may be considered to be zero since the pneumatic speed of the hot air passing through the interstices is lower than the minimum fluidizing velocity as hereinbefore stated. Nevertheless, as the time of completion of the drying operation, these drag forces may support the solid particles in the air within the shell 10 in view of the fact that the specific gravity of each particle is less than at the initial moisture content.

Figure 4:
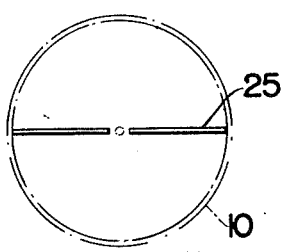
FIG. 4 is a top plan view of baffle members employed in the device of FIG. 1.

To further improve the shearing effect imparted to a bed of the solid particles by the stirrer blades, a plurality of baffles 25 may be provided on the inner surface of the shell 10 extending in the radial direction toward the center of the cross-section of said shell 10 as shown in FIG. 4. In addition, the number of the baffle members 25 may be selected as desired. However, a single pair of the baffle members 25, as shown, are recommended. In any event, each of the baffle members must be located in an interval between pairs of the blades 13, the size of said interval preferably being small.

Figure 7:
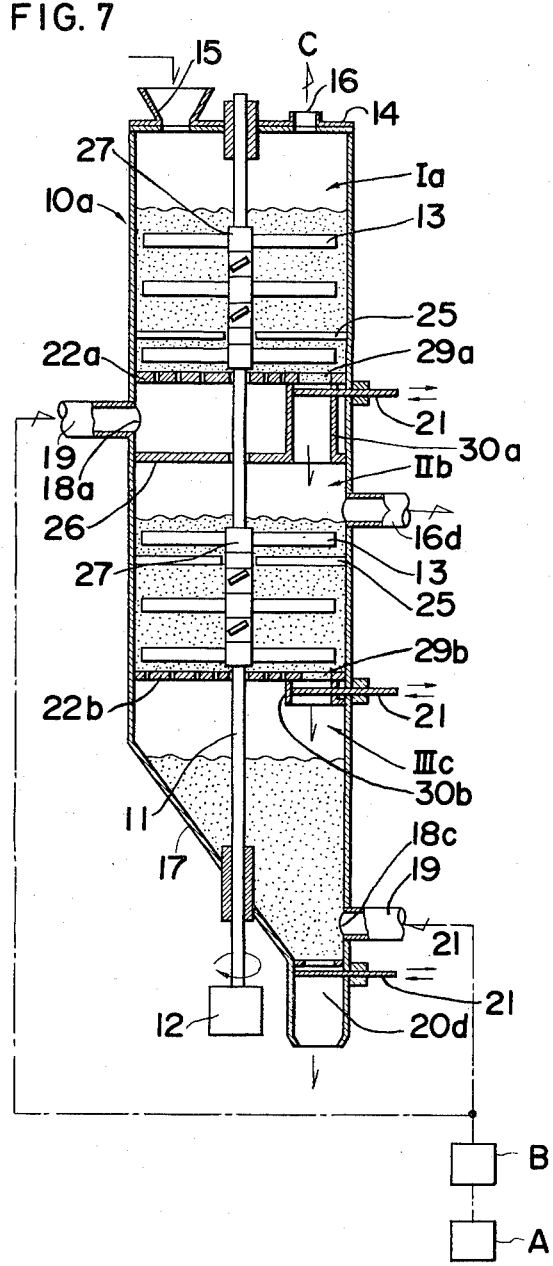
FIG. 7 is a longitudinal sectional view of a vertically upstanding drier assembly for continuous operation according to the present invention.

It is to be noted that the number of the pairs of blades 13 and/or the number of the blades 13 of each pair may be selected as desired, depending upon the design of the drier to be used in connection with the method of the present invention. For example, in one of the preferred embodiments of the present invention, which is shown in FIG. 7, each drier unit includes five pairs of blades 13, as will be described later.

If the proper shearing effect is produced for the pneumatic speed of the hot air passing through the interstices among the solid particles, the solid particles will undergo the optimum fluidizing motion to an extent that the sticking phenomenon among the particles oftentimes inherent during a period in which the moisture content is at the critical value can be advantageously prevented. Abrasion will also occur among the particles and, therefore, the surface of each particle can be polished.

Although the amount of the solid particles to be dried during each operation varies, depending upon the volume of that portion of the shell 10 in which they are accommodated, it must be such that both the upper and lower levels of a bed of the solid particles can be substantially uniformly dried.

Although the mechanical strength of each particle, especially crystalline ones, is naturally reduced as the drying operation proceeds, no destruction of the particle structure will occur. This is because, as hereinbefore stated, the specific gravity of the particle is reduced as the drying operation proceeds, so that part of the solid particles can be supported by the drag forces caused by the hot air passing through the interstices thereamong, and, accordingly, the shearing force imparted by the stirrer blades can also be reduced.

It is to be noted that, prior to commencement of the drying operation, the interior of the shell 10 including the stirrer blades 13 and the distributor plate 22 is preferably pre-heated by the hot air fed from the pneumatic source.

Furthermore, the pneumatic speed of the hot air passing through the conduit 19 into a chamber defined by the undersurface of the distributor plate 22 and the tapered end portion 17 may be higher than the pneumatic speed of the hot air passing through the interstices among the solid particles. This can be achieved by the design of the small holes 23 provided in the distributor plate 22.

Figure 6:
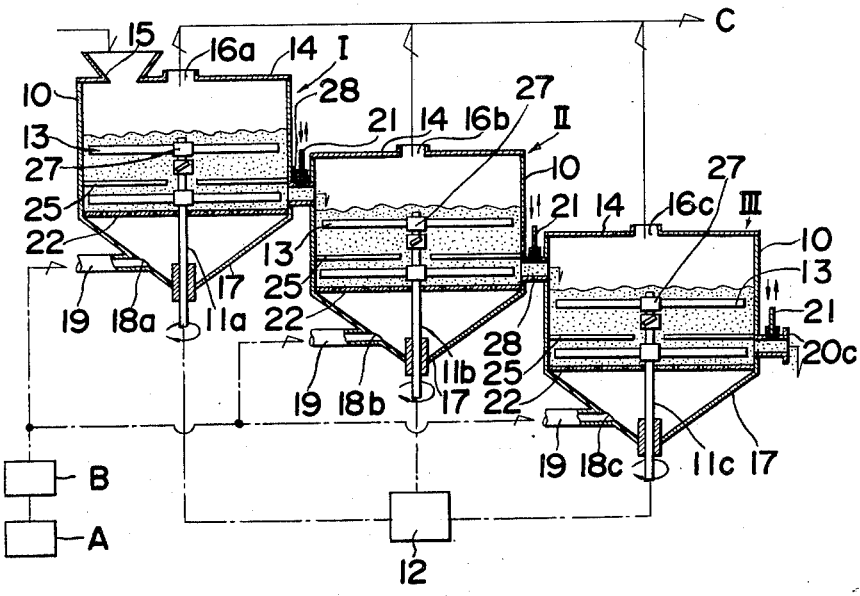
FIG. 6 is a longitudinal sectional view of a three-stage drier assembly for continuous operation according to the present invention.

If continuous operation is desired instead of a batch operation, the device shown in FIG. 1 can be utilized in the ways as shown in FIGS. 6 and 7.

Referring now to FIG. 6, there is shown three drier units I, II and III, each having the same construction as that of FIG. 1. These three units I, II and III are, in the instance as shown, connected in stair form in such a manner that the outflow port of the unit I is connected with a feed port of the unit II and the outflow of the unit II with a feed port of the unit III, respectively, through troughs 28, said feed ports being a modified form of the hopper 15 shown in FIG. 1. Instead of the stair-form of the arrangement, these units I, II and III may be transversely arranged, in which case the outflow ports of the units I and II are, respectively, connected with the feed ports of the units II and III by means of, for example, bucket conveyors.

In the arrangement shown in FIG. 6, only the unit II is adapted to perform the method of the present invention, as hereinbefore described. In practice, the first stage unit I is adapted for a pre-drying operation in which the pre-drying is carried out to an extent that the initial moisture content is reduced to a value slightly higher than the critical value, acceptable by the second stage unit II. The drying condition in the third stage unit III for final drying may not be so strict as in the second stage unit II, and, accordingly, this unit III may be replaced by a conventional dryer as hereinbefore stated.

Means for driving the three stirrer shafts 11a, 11b and 11c may be a single motor 12. In this case, a reduction gear (not shown) must be disposed in the connection between the motor and the stirrer shaft 11b to enable the latter to rotate at a comparatively lower rate, within the range of 8 to 40 rpm as hereinbefore stated. Similarly, the three inlet ports 18a, 18b and 18c may be connected with a single pneumatic source A, in which case a pneumatic flow regulator (not shown) must be disposed especially in the connection between the pneumatic source A and the inlet port 18b so that the pneumatic speed of the hot air passing through the interstices among the solid particles in the unit II is lower than the minimum fluidizing velocity.

The dust exits 16a, 16b and 16c may be, separately or collectively, connected with an independent or single dust collection equipment C by means of suitable exhaust conduits.

It will be clearly understood that wet particles fed into the unit I can be recovered from the unit III as dried particles in a continuous manner.

Figure 8:
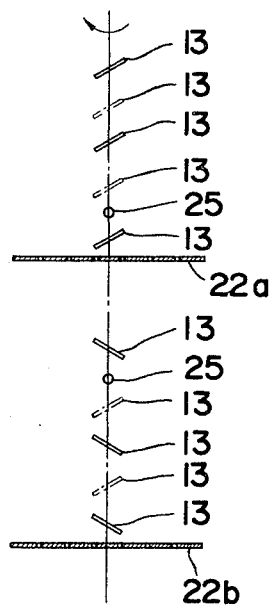
FIG. 8 is a lateral side view of the stirrer blades employed in the assembly of FIG. 7.

Referring now to FIG. 7, the drier assembly of a tower type is shown as comprising a single shell 10a of cylindrical shape having the upper end closed by the cover plate 14 and the other end eccentrically tapered to provide the tapered end 17. The shell 10a has therein three chambers Ia, IIb and IIIc, respectively, corresponding to the units I, II and III shown in FIG. 6, but a single stirrer arrangement is employed similar to that shown in FIG. 1. This single stirrer arrangement comprises two sets of five pairs of the blades 13 accommodated, respectively, within the chambers Ia and IIb. The arrangement of the blade pairs of each set is such that the blades 13 accommodated within the chamber Ia are all downwardly oriented in the direction of rotation thereof, as shown in the upper portion of FIG. 8, while the blades 13 accommodated within the chamber IIb are upwardly and downwardly oriented in an alternate manner in the same direction as shown by the lower portion of FIG. 8.

The outflow port of each chamber Ia, IIb and IIIc from which the solid particles can be recovered may be disposed either within or outside the shell 10a. In the instance as shown, the outflow ports of the chambers Ia and IIb are disposed within the shell 10a so as to connect between the chambers Ia and IIb and the chambers IIb and IIIc, respectively, through openings 29a and 29b formed in the distributor plates 22a and 22b. It is to be noted that the undersurface of each of the distributor plates 22a and 22b is provided with respective guide ducts 30a and 30b in register with the openings 29a and 29b for guiding the flow of the solid particles from one chamber to another. The solid particles contained in the chamber IIIc are adapted to be recovered from the outflow port 20d provided at the lower extremity of the tapered end portion 17 of the shell 10a.

Disposed between the distributor plate 22a and the chamber IIb is a partition 26 which concurrently acts to guide a stream of hot air supplied through the inlet port 18a into the solid particles contained in the chamber Ia. The chamber Ia is utilized for pre-drying substantially in the same manner as the unit I shown in FIG. 6.

The chamber IIIc for final drying is not provided with the stirrer blades. However, this chamber IIIc permits the solid particles contained therein to be freely supported by the drag forces by a stream of the hot air supplied through the inlet port 18c positioned adjacent to the lower extremity of the shell 10a. The pneumatic speed of the hot air supplied through the inlet port 18c of the chamber IIIc should be adjusted such that the front of the heat wave, when the hot air is fed through the interstices among the solid particles contained in the chamber IIb, travels therethrough at a speed lower than the minimum fluidizing velocity with respect to the solid particles in the chamber IIb. The hot air thus passing through the interstices among the solid particles in the chamber IIb is adapted to be exhausted from the exit 16d.

It is to be noted that, in the case where it is desired that the drying conditions in chamber Ia be substantially the same as those in the chamber IIb, the partition 26 may be omitted or the exit 16d may be connected with a lower portion of the chamber Ia.

In either of the embodiments shown in FIGS. 6 and 7, since the minimum fluidizing velocity differs from unit to unit with respect to the following stage of drying, the pneumatic speed of the hot air passing through the interstices among the particles in each unit or chamber may be different to facilitate the drying speed. Moreover, the collector equipment may be omitted, since the pneumatic speed is comparatively low so that substantially no dust will be produced.

It is to be noted that, in view of the fact that the vertical upstanding arrangement 10a requires a long stirrer shaft 11, the end extremity of said shaft 11 remote from the other end extremity connected with the motor 12 must preferably be supported by a suitable bearing provided in the cover plate 14 such as shown in FIG. 7.

Furthermore, according to the present invention, means including a hygrometer may be provided for detecting the moisture content of each particle, whereby the operator can confirm the drying condition proper for each drier. In this case, the hygrometer may be mounted with its sensing portion exposed to the interior of the shell. Instead of the hygrometer means, particularly for batch operation, an electric or electronic timing device may be provided in connection with the motor 12 to stop the drying operation after a predetermined time.

The present invention will be hereinafter illustrated by way of example. However, it is to be noted that the present invention is not to be limited thereby, but should be construed as including any devices capable of performing the method for drying according to the present invention.

EXAMPLE I

The subject material was dried with the use of the arrangement shown in FIG. 1 under the following particulars and conditions:

| Drier | |
|---|---|
| Inner Diameter of Shell | 300 mm. |
| Total Length of Blade Pair | 280 mm. |
| Blade Pitch Angle | 30° |
| (Upper and Lower Blade Pairs are upwardly oriented while Intermediate Blade Pair downwardly oriented.) | |
| Hot Air | |
| Temperature | 80°C. |
| Subject Material—L-glutamate | |
| Particle Size | 1.5 to 0.2 mm. |
| Initial Moisture Content | 2.15% |
| Height of Subject Material charged into shell | 150 mm. |
| Minimum Fluidizing Velocity Umf | approx. 12 cm/sec. |

The results are tabulated in Table I.

EXAMPLE II

The subject material was dried with the use of the arrangement shown in FIG. 1 under the following particulars and conditions:

| Drier | Same as in Example I |
|---|---|
| Hot Air | Same as in Example I |
| Subject Material | L-glutamate |
| Particle Size | 0.35 to 0.1 mm. |
| Initial Moisture Content | 2.54% |
| Height of subject material charged into shell | 150 mm. |
| Minimum fluidizing velocity Umf | Approx. 7 cm/sec. |

The results are tabulated in Table II.

EXAMPLE III

The subject material was dried with the use of the arrangement shown in FIG. 1 under the following particulars and conditions:

| Drier | Same as in Example I |
|---|---|
| Hot Air | Same as in Example I |
| Subject Material | Granular Sugar |
| Particle Size | 2.4 to 0.8 mm. |
| Initial Moisture Content | 2.8% |
| Height of Subject Material Charged into shell | 150 mm. |
| Minimum Fluidizing Velocity Umf | Approx. 24 cm/sec. |

The results of experiment in terms of the outer appearance of the dried subject matter, including the degree of luster, sticking rate, and pulverized rate, are tabulated in Table III.

EXAMPLE IV

The subject material was dried with the use of the arrangement shown in FIG. 1 under the following particles and conditions:

| Drier | |
|---|---|
| Inner Diameter of Shell | [A] 300 mm [B] 700 mm |
| Total Length of Blade Pair | [A] 280 mm [B] 680 mm |
| Blade Pitch Angle | Same as in Example I |
| Hot Air | Same as in Example I |
| Subject Material | Same as in Example I |

The results are tabulated in Table IV.

As evidenced from the foregoing Examples I through IV, the present invention is advantageous over the prior art in that the solid particles can be well dried and polished without the accompanying sticking phenomenon and destruction of the particles structure, and, therefore, the invention is effective to provide a product of relatively higher quality satisfying the commercial requirements.

TABLE I

| PNEUMATIC SPEED | | BLADE ROTATION (rpm) | STICKING RATE (%) | PULVERIZED RATE (%) | LUSTER (MEASURED BY 10 PERSONS) | | | FROUDE No. OF BLADE |
|---|---|---|---|---|---|---|---|---|
| | | | | | EXCELLENT | GOOD | NOT GOOD | |
| | 0.3 × Umf | 30 | 0.2 | 25 | 7 | 3 | 0 | $7.14 \times 10^{-3}$ |
| | " | 15 | 0.2 | 20 | 7 | 3 | 0 | $1.79 \times 10^{-3}$ |
| LOWER | 0.5 × Umf | 30 | 0.2 | 8 | 10 | 0 | 0 | $7.14 \times 10^{-3}$ |
| THAN | " | 15 | 0.3 | 5 | 10 | 0 | 0 | $1.79 \times 10^{-3}$ |
| Umf | 0.8 × Umf | 50 | 0.2 | 20 | 7 | 3 | 0 | $19.7 \times 10^{-3}$ |
| | | 42 | 0.2 | 18 | 7 | 3 | 0 | $14.2 \times 10^{-3}$ |
| | | 40 | 1.0 | 1.8 | 10 | 0 | 0 | $12.6 \times 10^{-3}$ |
| | | 30 | 1.3 | 1.5 | 10 | 0 | 0 | $7.14 \times 10^{-3}$ |
| | | 15 | 1.9 | 1.0 | 10 | 0 | 0 | $1.79 \times 10^{-3}$ |
| | | 10 | 9.1 | 1.0 | 10 | 0 | 0 | $0.79 \times 10^{-3}$ |
| | | 8 | 21.0 | 1.0 | 4 | 6 | 0 | $0.50 \times 10^{-3}$ |
| | | 6 | 23.0 | 1.0 | 4 | 6 | 0 | $0.29 \times 10^{-3}$ |
| HIGHER | 1.2 × Umf | 30 | 18 | 0.8 | 5 | 5 | 0 | $7.14 \times 10^{-3}$ |
| THAN | | 15 | 25 | 1.0 | 4 | 6 | 0 | $1.79 \times 10^{-3}$ |
| Umf | 3.0 × Umf | 30 | 70 | 0.5 | 0 | 3 | 7 | $7.14 \times 10^{-3}$ |
| | | 15 | 90 | 0.7 | 0 | 4 | 6 | $1.79 \times 10^{-3}$ |

TABLE II

| PNEUMATIC SPEED | BLADE ROTATION (rpm) | STICKING RATE (%) | PULVERIZED RATE (%) | LUSTER (MEASURED BY 10 PERSONS) | | | FROUDE NO. OF BLADE |
|---|---|---|---|---|---|---|---|
| | | | | EXCELLENT | GOOD | NOT GOOD | |
| $0.4 \times U_{mf}$ | 15 | 1.2 | 18 | 6 | 4 | 0 | $1.79 \times 10^{-3}$ |
| $0.9 \times U_{mf}$ | 30 | 1.2 | 0.3 | 10 | 0 | 0 | $7.14 \times 10^{-3}$ |
| " | 15 | 2.2 | 0.2 | 10 | 0 | 0 | $1.79 \times 10^{-3}$ |
| " | 6 | 19.1 | 0.1 | 5 | 5 | 0 | $0.29 \times 10^{-3}$ |
| $1.5 \times U_{mf}$ | 30 | 20 | 0.1 | 0 | 5 | 5 | $7.14 \times 10^{-3}$ |
| " | 15 | 27 | 0.1 | 0 | 4 | 6 | $1.79 \times 10^{-3}$ |
| $3.0 \times U_{mf}$ | 30 | 90 | 0.2 | 0 | 2 | 8 | $7.14 \times 10^{-3}$ |
| " | 15 | 99 | 0.1 | 0 | 2 | 8 | $1.79 \times 10^{-3}$ |

TABLE III

| PNEUMATIC SPEED | BLADE ROTATION (rpm) | OVERALL RESULTS (MEASURED BY 10 PERSONS) | | |
|---|---|---|---|---|
| | | Excellent | Good | Not Good |
| LOWER THAN $U_{mf}$ $0.7 \times U_{mf}$ | 30 | 10 | 0 | 0 |
| HIGHER THAN $U_{mf}$ $3.0 \times U_{mf}$ | 30 | 0 | 10 | 0 |

TABLE IV

| DIAMETER OF BLADE | PNEUMATIC SPEED | BLADE ROTATION (rpm) | STICKING RATE (%) | PULVERIZED RATE (%) | LUSTER (MEASURED BY 10 PERSONS) | | | FROUDE NO. |
|---|---|---|---|---|---|---|---|---|
| | | | | | EXCELLENT | GOOD | NOT GOOD | |
| 280 | $0.8 \times U_{mf}$ | 30 | 1.3 | 1.5 | 10 | 0 | 0 | $7.14 \times 10^{-3}$ |
| 280 | $0.8 \times U_{mf}$ | 15 | 1.9 | 1.0 | 10 | 0 | 0 | $1.79 \times 10^{-3}$ |
| 280 | $0.8 \times U_{mf}$ | 8 | 21.0 | 1.0 | 4 | 6 | 0 | $0.50 \times 10^{-3}$ |
| 680 | $0.8 \times U_{mf}$ | 15 | 1.5 | 1.2 | 10 | 0 | 0 | $4.34 \times 10^{-3}$ |
| 680 | $0.8 \times U_{mf}$ | 10 | 1.8 | 1.0 | 10 | 0 | 0 | $1.93 \times 10^{-3}$ |
| 680 | $0.8 \times U_{mf}$ | 5 | 25.0 | 1.0 | 5 | 5 | 0 | $0.48 \times 10^{-3}$ |

What is claimed is:

1. A method of drying granular or crystalline particles which initially have a relatively high moisture content as compared to the moisture content after they are dried and which particles tend to stick together to form lumps during the drying thereof, and which particles are delicate and subject to damage by striking the parts of a dryer apparatus at high velocities, said method comprising the steps of feeding the proper amount of undried particles into a shell of a drier to form a bed of particles in the shell, the drier having therein means for stirring the bed of particles thus fed by applying a horizontal fluidized bed shearing force to the bed of particles, actuating said means for applying a horizontal fluidized bed shearing force to the fluidized bed at a speed for giving a gentle motion to said bed of said particles and insufficient for carryover of said particles which may cause a portion of said particles to splash on the inner surface of said shell of said drier, and simultaneously with said application of said horizontal fluidized bed shearing force, feeding gaseous drying medium upwardly from the bottom of said bed of particles through the interstices among said particles at a velocity which is less than the minimum fluidizing velocity for an undisturbed bed of such particles when the particles have a moisture content from just above the critical moisture content to a moisture content just below the critical moisture content, the critical moisture content being the moisture content at which the particles tend to stick to each other, and a velocity which is greater than one half said minimum fluidizing velocity.

2. A method as claimed in claim 1 said stirring means is a rotary stirring means and is driven at a rate so as to represent a Froude number within the range of $0.8 \times 10^{-3}$ to $13.0 \times 10^{-3}$.

3. A method as claimed in claim 2 in which said rotary stirring means comprises a plurality of pairs of straight blades extending diametrally from a central shaft, the pairs of blades being spaced one above the other.

4. A method as claimed in claim 3 in which said rotary stirring means further comprises fixed baffle blades positioned between the lowermost pair of blades and the next higher pair of blades on the rotary stirring means.

5. A method as claimed in claim 1 wherein said drying medium is a fresh hot gas having a temperature which will not damage the chemical properties of the material of said particles.

* * * * *